Patented Mar. 4, 1952

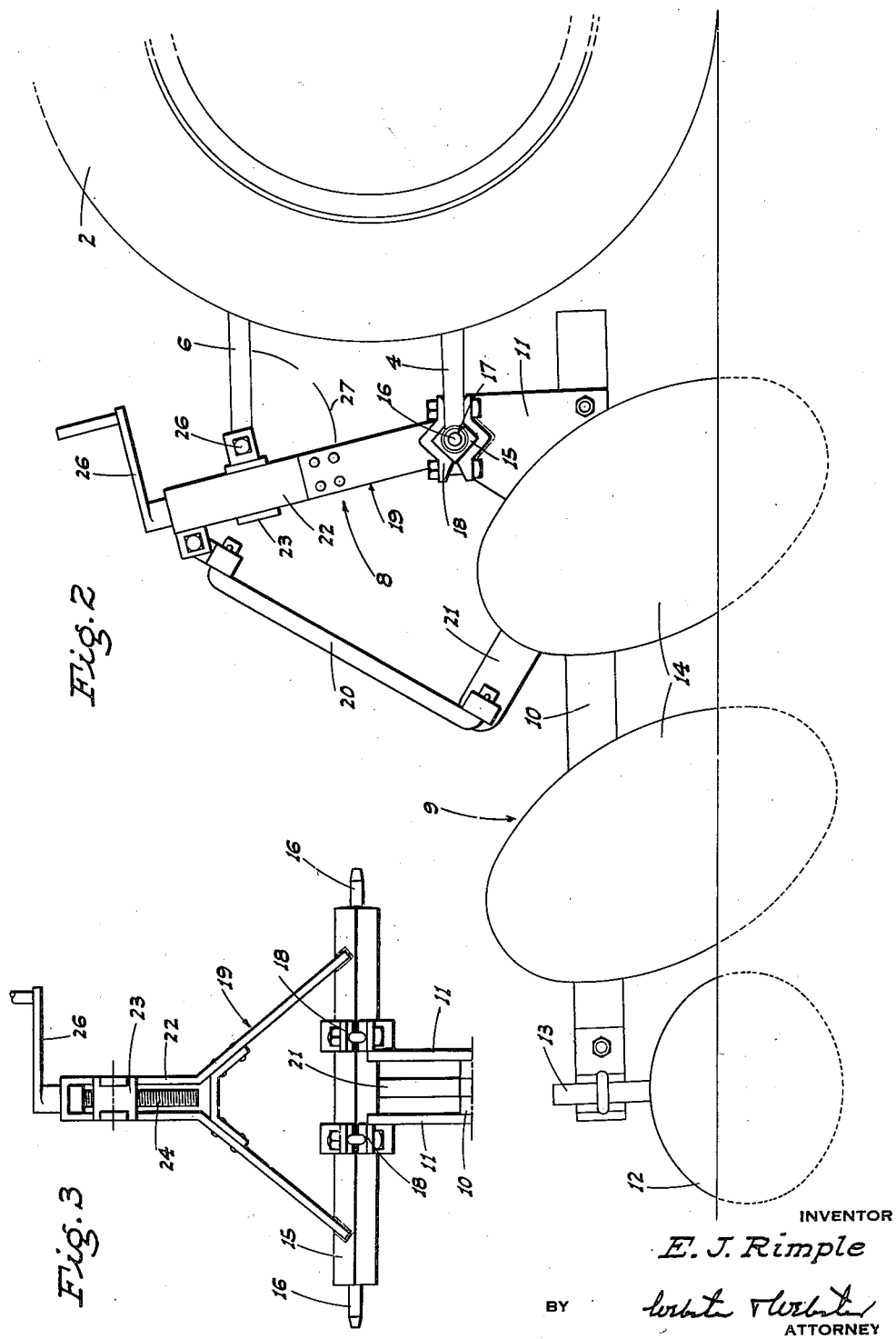

2,587,763

UNITED STATES PATENT OFFICE 2,587,763

ADJUSTABLE HITCH FOR DIRECT CONNECTED IMPLEMENTS

Edward J. Rimple, Santa Clara, Calif., assignor to Rimple Manufacturing Co., Santa Clara, Calif., a corporation of California Application May 29, 1948, Serial No. 30,167

1 Claim. (Cl. 97—50)

This invention is directed to, and it is an object to provide, a hitch for direct connecting a ground working implement, such as a disc plow, to the power actuated lift mechanism on the rear of a tractor, whereby said mechanism is operative to adjust the implement between a lowered working position and a raised position for turning in the field or for transport.

Another object of the invention is to provide a hitch, as in the preceding paragraph, which is adjustable, in novel manner, to alter the relative working level of the rear of the implement in respect to the front end portion thereof; this to compensate for the tendency of the rear of the implement to raise to a greater extent than the front, especially when working in hard ground.

A further object of the invention is to provide a hitch, of the type described, which is readily and easily manually adjustable by a hand crank mounted in an accessible and convenient position.

A further object of the invention is to provide a reliable hitch for direct connected implements, and one which will be exceedingly effective for the purpose for which it is designed.

These objects are accomplished by means of such structure and relative arrangement of parts as will fully appear by a perusal of the following specification and claim.

In the drawings:

Fig. 2 is a similar view, but shows the hitch as adjusted to lower the relative working level of the rear end portion of the implement.

Fig. 3 is a fragmentary end elevation of the A-frame structure of the hitch including the crank actuated adjusting mechanism.

Figure 1:
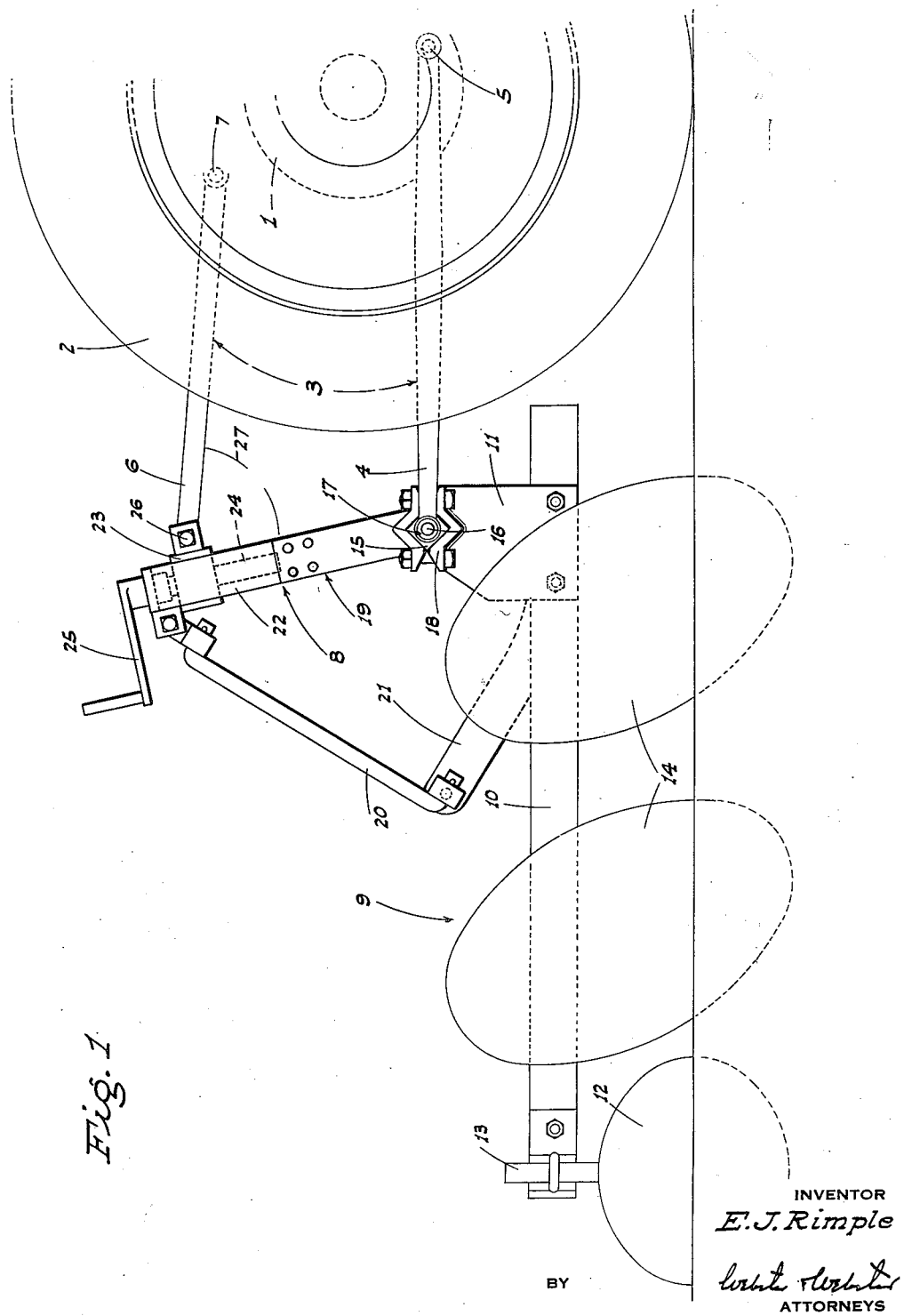
Fig. 1 is a side elevation of the adjustable hitch for direct-connected implements; the hitch being shown in its normal position of use.

Referring now more particularly to the characters of reference on the drawings, the hitch is adapted for use in connection with that type of a tractor, indicated in part and diagrammatically, as at 1, which includes transversely spaced rubber tire rear wheels 2, and—between said wheels—a rearwardly projecting power actuated lift hitch 3. This lift hitch 3 includes, below the wheel axis, a pair of transversely spaced power actuated lift links 4 which project rearwardly from pivots 5 to a termination some distance behind the wheels 2. A centrally disposed top link 6 is located in spaced relation above the lift links 4 and likewise projects from a pivot 7 on the tractor to a rear end termination back of said wheels.

The above lift hitch structure is conventional on certain tractors, such as the "Ford," and the hereinafter described implement hitch, which is the subject of the present invention, is especially designed for use with this type of lift hitch.

The implement hitch is indicated generally at 8, and is adapted to couple an implement 9 in direct-connected relation to the lift hitch 3. The implement 9 is here shown as a plow, including a longitudinal plow beam 10. At its forward end portion the longitudinal plow beam 10 is fitted with a pair of rigid, transversely spaced bracket plates 11 mounted in upstanding relation, while the rear end of said plow beam 10 is supported by a furrow wheel 12 attached to the beam by a standard 13. Intermediate its ends the plow beam 10 is fitted with plow shares or discs 14.

The implement hitch 8 comprises a transverse bar 15, square in cross section and fitted, at opposite ends, with trunnions 16. The trunnions 16 pivotally connect with the rear ends of corresponding lift links 4, as at 17, and the bracket plates 11 each include a clamp 18 which is rigidly and non-turnably secured to the square bar 15 centrally of its ends.

An A-frame 19 is fixed to and upstands centrally from the transverse bar 15, and a connecting or brace rod 20 leads from the top of the A-frame 19 at a downward and rearward incline to connection with a rearwardly and upwardly inclined arm 21 fixed with the plow beam 10 directly to the rear of the bracket plates 11. This brace structure further assures of rigidity between the A-frame 19 and plow beam 20, relieving the clamps 18 of some of the load.

The upper end portion of the A-frame 19 is formed as an upstanding guideway 22 slotted for the sliding reception of a nut 23 threaded on an upstanding screw 24 which extends through such guideway. The screw 24 is rotatable but mounted against axial displacement, and a hand crank 25 is fixed on the upper end of such screw above the guideway 22.

The central top link 6 of the lift hitch 3 of the tractor is pivotally connected, at its rear end, as at 26, to the slide nut 23. The A-frame 19, including the upstanding guideway 22, is disposed at a slight upward and rearward incline; i. e. is canted rearwardly so that the downward included angle 27 between said top link 6 and A-frame 19 is less than 90°. Also, said central top link 6 is normally at a slight upward and rearward incline, tending to approach parallelism relative to the lift links 44 as the lift hitch 3 swings downward; this by reason of the differential positioning of the pivotal centers 5 and 7.

When the implement 9 is working under normal conditions, the parts of the implement hitch 8 are as shown in Fig. 1, with the slide nut 23 relatively raised in the upstanding guideway 22. However, under certain working conditions, as where the ground is very hard, there is a tendency of the implement 9 to rise at its rear end and to thus not run level, as is desirable. Under such conditions the hitch 8 is adjusted as follows:

The hand crank 25 is rotated in a direction to cause the slide nut 23 to run downward in the guideway 22, which causes the upstanding A-frame 19 to be thrown rearwardly to a certain extent about the axis of the trunnions 16. This in turn swings the plow beam 10 downwardly about the same axis, with the result that there is a relative lowering of said plow beam progressively greater in extent from front to rear thereof. In other words, the plow beam 10 is adjusted downwardly at its rear end to compensate for the tendency of such end to rise when the implement is working in hard ground. Further, with the hitch 8 so adjusted the top link 6 nears parallelism relative to the lift links 4, at which time the lift hitch 3 has greater resistance to raising of the implement 9 at its rear end.

In use, the power-actuated lift hitch 3 is in a lowered position, as shown in Figs. 1 and 2. For turning at the end of a row, or for transport from place to place, the entire implement is raised from the ground by operation of the power-actuated lift hitch 3 to an elevated position (not shown).

The described implement hitch provides a practical and rugged structure for the intended purpose, and its adjustment can be accomplished with facility by manipulation of the hand crank 25 by the tractor operator, and to the extent that working conditions may require.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

A hitch to direct-connect a longitudinally extending implement frame to a tractor draft unit for vertical tilting adjustment of said frame, said draft unit including a pair of transversely spaced lower draft links and a central upper draft link; the hitch comprising an A-frame unit upstanding from and rigid with the implement frame at its forward end, means pivoting the lower draft links on the A-frame unit at its lower end, said unit including transversely spaced arms, the upper portions of which are parallel to each other, an adjustment screw mounted against axial movement in the A-frame unit and depending between said parallel arm portions, a slide nut guided by said arm portions and through which the screw projects, and a pivotal connection between the upper draft link and said nut in front of the A-frame unit.

EDWARD J. RIMPLE.

REFERENCES CITED

The following references are of record in the file of this patent:

UNITED STATES PATENTS

| Number | Name | Date |
| --- | --- | --- |
| 1,118,023 | Knoblock | Nov. 24, 1914 |
| 2,309,750 | Carrington | Feb. 2, 1943 |
| 2,390,968 | Traphagen | Dec. 11, 1945 |
| 2,401,837 | Mellen et al. | June 11, 1946 |
| 2,414,114 | Martin | Jan. 14, 1947 |
| 2,437,059 | Williams | Mar. 2, 1948 |
| 2,453,723 | Palmer et al. | Nov. 16, 1948 |

FOREIGN PATENTS

| Number | Country | Date |
| --- | --- | --- |
| 456,211 | Germany | Feb. 17, 1928 |
| | (Addition to Patent No. 443,219) | |